US012626670B2

(12) United States Patent
Li et al.

(10) Patent No.: US 12,626,670 B2
(45) Date of Patent: May 12, 2026

(54) IMAGE DISPLAY METHODS AND APPARATUSES

(71) Applicant: BOE Technology Group Co., Ltd., Beijing (CN)

(72) Inventors: Cunqing Li, Beijing (CN); Kun Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 225 days.

(21) Appl. No.: 18/280,302

(22) PCT Filed: Jul. 18, 2022

(86) PCT No.: PCT/CN2022/106205
§ 371 (c)(1),
(2) Date: Sep. 5, 2023

(87) PCT Pub. No.: WO2024/016103
PCT Pub. Date: Jan. 25, 2024

(65) Prior Publication Data
US 2025/0054454 A1 Feb. 13, 2025

(51) Int. Cl.
*G09G 3/34* (2006.01)

(52) U.S. Cl.
CPC ..... *G09G 3/344* (2013.01); *G09G 2320/0666* (2013.01); *G09G 2340/045* (2013.01)

(58) Field of Classification Search
CPC ........... G09G 3/344; G09G 2320/0666; G09G 2340/045; G09F 9/00
See application file for complete search history.

(56) References Cited

U.S. PATENT DOCUMENTS 10,049,477 B1 * 8/2018 Kokemohr ............ G06T 11/001
2003/0002060 A1 * 1/2003 Yokoyama ............... H04N 1/56 358/1.9

(Continued)

FOREIGN PATENT DOCUMENTS

CN 106098019 A 11/2016
CN 107086027 A 8/2017

(Continued)

OTHER PUBLICATIONS

Zhang, machine translation of CN-107832273-A (Year: 2018).*
PCT/CN2022/106205 international search report.
PCT/CN2022/106205 Written Opinion.

*Primary Examiner* — Kee M Tung
*Assistant Examiner* — Xiaoming Wei
(74) *Attorney, Agent, or Firm* — IPro, PLLC

(57) ABSTRACT

An image display method and apparatus are provided. The method includes: determining a target display position of a target object in an original image and a first size of a display region of an ink screen (102); generating a monochrome image with the first size according to the original image, where color values of pixel points in the monochrome image include at least one standard color value, and the target object is located at a target display position in the monochrome image (104); sending the monochrome image to the ink screen, so that the monochrome image is displayed by the ink screen in the display region (106). This method can improve the definition of the monochrome image displayed by the ink screen.

15 Claims, 4 Drawing Sheets

(56) References Cited

U.S. PATENT DOCUMENTS

| | | | | |
|---|---|---|---|---|
| 2014/0095588 | A1* | 4/2014 | Gowen | G06F 3/1242 709/203 |
| 2015/0055151 | A1* | 2/2015 | Inomata | G06T 11/60 358/1.9 |
| 2018/0301078 | A1 | 10/2018 | Zhou et al. | |
| 2022/0148537 | A1* | 5/2022 | Wang | G09G 3/344 |
| 2022/0301118 | A1* | 9/2022 | Frey | G06T 5/50 |

FOREIGN PATENT DOCUMENTS

| | | | | |
|---|---|---|---|---|
| CN | 107832273 | A * | 3/2018 | G06F 40/106 |
| CN | 109191384 | A | 1/2019 | |
| CN | 110570380 | A | 12/2019 | |
| CN | 112965678 | A | 6/2021 | |
| CN | 113986407 | A | 1/2022 | |
| JP | 2002300333 | A | 10/2002 | |

* cited by examiner

IMAGE DISPLAY METHODS AND APPARATUSES

CROSS-REFERENCE TO RELATED APPLICATIONS

This application is a national stage of international PCT Application No. PCT/CN2022/106205 filed on Jul. 18, 2022, the entire contents of which are incorporated herein by reference.

TECHNICAL FIELD

The present disclosure relates to the field of image processing technology, and in particular, to an image display method and apparatus.

BACKGROUND

With the increasing maturity of Electronic Ink (E-ink) technology, E-ink screens (hereinafter referred to as ink screens) with characteristics such as low power consumption and visual friendliness are gradually applied to readers, advertising boards, product labels, and other scenarios.

At present stage, a drawn, to-be-displayed image is provided usually by a terminal device to an ink screen for display. In related art, if a size of a to-be-displayed monochrome image is inconsistent with that of the ink screen, the image needs to be scaled to have a same size as the ink screen and thereafter the image is displayed. Since details of a displayed object in the monochrome image may be lost during the scaling, this method often leads to lower definition or even deformation of the displayed object on the ink screen. The display effect needs to be improved.

SUMMARY

In view of this, in embodiments of the present disclosure, an image display method and apparatus are provided to address the shortcomings in the related art.

According to a first aspect of the embodiments of the present disclosure, an image display method is provided, including: determining a target display position of a target object in an original image and a first size of a display region of an ink screen;

generating a monochrome image with the first size according to the original image, where color values of pixel points in the monochrome image include at least one standard color value, and the target object is located at the target display position in the monochrome image;

sending the monochrome image to the ink screen, so that the monochrome image is displayed by the ink screen in the display region.

According to a second aspect of the embodiments of the present disclosure, an image display apparatus is provided, including: one or more processors configured to:

determine a target display position of a target object in an original image and a first size of a display region of an ink screen;

generate a monochrome image with the first size according to the original image, where color values of pixel points in the monochrome image include at least one standard color value, and the target object is located at the target display position in the monochrome image;

send the monochrome image to the ink screen, so that the monochrome image is displayed by the ink screen in the display region.

According to a third aspect of the embodiments of the present disclosure, an electronic device is provided, including: a processor: a memory for storing processor executable instructions, where the processor is configured to implement the image display method according to the first aspect.

According to a fourth aspect of the embodiments of the present disclosure, a non-transient computer readable storage medium on which a computer program is stored is provided, where the program is executed by a processor to perform steps in the image display method according to the first aspect.

According to the embodiments of the present disclosure, a target display position of a target object in an original image and a first size of a display region of an ink screen are first determined; then a monochrome image with the first size is generated according to the original image, where color values of all pixel points in the monochrome image include at least one standard color value, and the target object is located at a target display position in the monochrome image; and finally, the monochrome image is sent to the ink screen, so that the monochrome image is displayed by the ink screen in the display region.

Through the embodiments, a monochrome image with a size being the same as that of a display region of an ink screen (i.e. a first size) is directly generated by a terminal device, and a target object is located at a same target display position in the monochrome image as in an original image. Based on this, a to-be-displayed monochrome image can be displayed directly by the ink screen without being scaled, which avoids details of a target object in the image from being lost, thereby ensuring that the monochrome image displayed by the ink screen has higher definition and avoiding deformation of the target object.

It should be understood that the above general description and the following detailed description are only exemplary and explanatory, but cannot limit the present disclosure.

BRIEF DESCRIPTION OF THE DRAWINGS

In order to illustrate the technical solutions in the embodiments of the present disclosure more clearly, the accompanying drawings required for description of the embodiments will be briefly introduced below. Apparently, the drawings in the following description are only some embodiments of the present disclosure. For those ordinary skilled in the art, other drawings can be acquired from these drawings without creative efforts.

DETAILED DESCRIPTION OF THE EMBODIMENTS

The technical solutions in the embodiments of the present disclosure will be clearly and completely described below with reference to the drawings in the embodiments of the present disclosure. Apparently, the described embodiments are only some but not all of the embodiments of the present disclosure. All other embodiments obtained by those ordinary skilled in the art based on the embodiments of the present disclosure without creative efforts shall fall within the protection scope of the present disclosure.

In relevant art, if a size of a to-be-displayed monochrome image is inconsistent with that of an ink screen, the image needs to be scaled to have a same size as the ink screen and thereafter the image is displayed. For example, in a scenario where a user typesets a to-be-displayed image through a graphic and text editing box provided by a Flutter application running in a mobile phone, the to-be-displayed image generated by the Flutter application through Widget screenshot technology usually has a same size as a screen of the mobile phone or the graphic and text editing box, but has a different size as the ink screen. In this case, the image needs to be scaled to have a same size as the ink screen, so that the image can be fully displayed by the ink screen. However, the scaling operation may lose details of the to-be-displayed image, leading to lower definition or even deformation of an image actually displayed on the ink screen. The display effect needs to be improved.

To solve the problems in the related art, the present disclosure provides an image display method and apparatus in which the definition of a monochrome image displayed on an ink screen is improved by drawing the monochrome image in equal proportion. A data certificate storage solution of the present disclosure will be described in detail below with reference to the accompanying drawings and corresponding embodiments.

Figure 1:
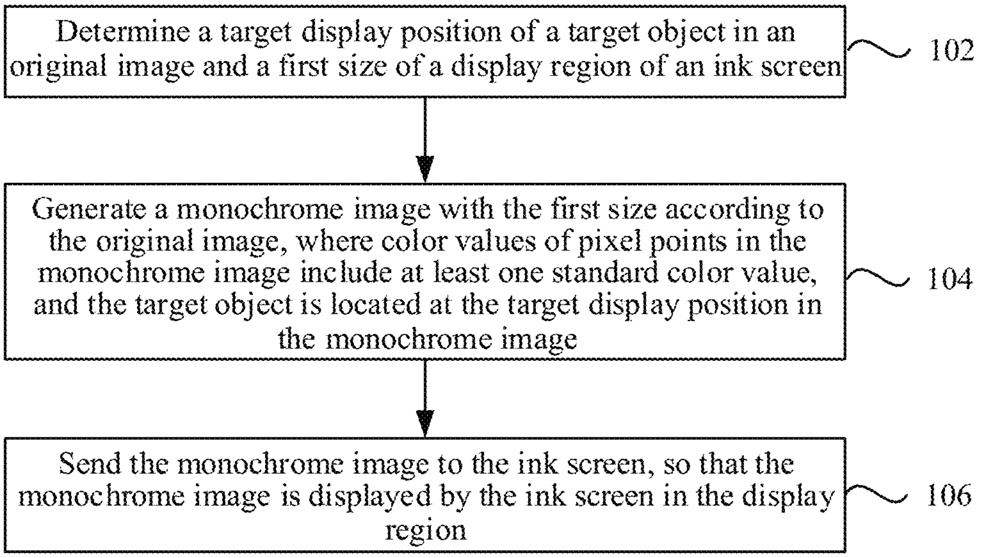
FIG. 1 is a flowchart illustrating an image display method according to an embodiment of the present disclosure.

FIG. 1 is a flowchart illustrating an image display method according to an exemplary embodiment of the present disclosure. As shown in FIG. 1, the method includes the following steps 102-106.

At step 102, a target display position of a target object in an original image and a first size of a display region of an ink screen are determined.

The image display method described in the present disclosure may be applied to a terminal device or a server connected with an ink screen. The terminal device may be a mobile phone, or be a tablet device, a notebook computer, a Personal Digital Assistant (PDA), a wearable device (for example, smart glasses or a smart watch), a Virtual Reality (VR) device, an Augmented Reality (AR) device, etc. The server may be a physical server including an independent host, or be a virtual server, a cloud server, etc. carried by a host cluster, which are not limited in the embodiments of the present disclosure. Hereinafter, the terminal device will be taken mainly as an example for illustration.

Before a monochrome image for an ink screen to display is generated, a terminal device needs to first determine a target display position of a target object in an original image and a size of a display region of the ink screen. The target object described in the present disclosure is a to-be-displayed object, which may be an image, a text or other contents.

In an embodiment, the terminal device may provide a user with an object typesetting function, so that the user can typeset the target object based on this function. The object typesetting function and methods for generating the monochrome image described in the following embodiments may be integrated into an application and provided to the user in the form of program functions of the application. For example, the terminal device may run a Flutter application, which may self-adapt to a screen of the terminal device, so that the user can typeset the target object through an object model Widge provided in a user interface of the application.

Based on the object typesetting function, the terminal device may display an object typesetting region on a first screen different from the ink screen, and in response to an object typesetting operation detected in the object typesetting region, determine a to-be-typeset target object. The first screen is a screen different from the ink screen. The first screen may be a Light-Emitting Diode (LED) screen, an Organic Light-Emitting Diode (OLED) screen, a Liquid Crystal Display (LCD) screen, etc., and of course, the first screen may be another ink screen, which is not limited in the embodiments of the present disclosure. The object typesetting operation may include adding objects, deleting objects, dragging objects, modifying object parameters (such as colors and sizes), etc. Based on the above operations, the user can typeset the target object in the object typesetting region.

In addition, to simplify the typesetting operation of the user and improve the typesetting efficiency, the terminal device may automatically typeset objects, for example, automatically adjust a distance between the objects and positions or sizes of the objects, in a target typesetting region according to a pre-defined default typesetting method. Based on this, the user needs only to make simple adjustments (or even no adjustment) on the basis of the automatic typesetting by the terminal device to complete the process of typesetting the target object, which is easier and more efficient.

Figure 2:
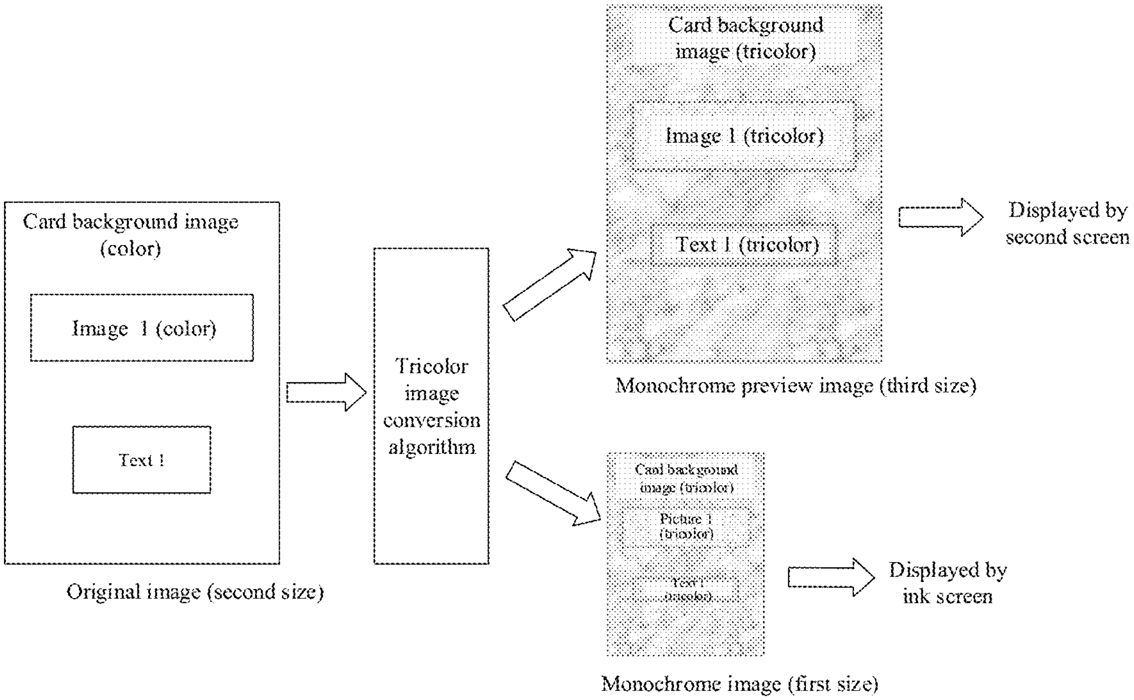
FIG. 2 is a schematic diagram illustrating an image display process according to an embodiment of the present disclosure.

As shown in FIG. 2, a user may arrange two image layers, i.e., an upper image layer and a lower image layer, in an object typesetting region, then place a color card background image on the lower image layer, and place image 1 and text 1 of any color on the upper image layer. For example, the image 1 is placed by dragging or selecting from a folder, and the text 1 is placed by pasting or manually editing. The image 1 may be a color image or a black-and-white image, and the text 1 may be a color text or a black-and-white text. Further, the user may adjust sizes, relative positions, etc. of the image 1 and the text 1 by performing an object adjustment operation to complete the typesetting operation on the objects.

After the object typesetting operation is completed, a position, a color and other parameters of each target object included in the object typesetting region are determined. The terminal device may take a displayed picture now in the object typesetting region as an original image, and take the position of the target object in the object typesetting region as a target display position of the target object in the original image. Of course, in a case where the original image includes multiple target objects, the terminal device may respectively determine target display positions of the target objects. For example, in a case of typesetting based on the Flutter application, the terminal device may generate the original image through Widget screenshot technology of the application. As shown in FIG. 2, the terminal device may determine the displayed picture composed of the card background image, image 1 and text 1 that have been typeset as the original image, and accordingly, the target display position of each object in the original image is determined. The size of the original image determined in the previous embodiments may be the same as that of the object typesetting region, that is, both the size of the object typesetting region and that of the original image are a second size. Or the size of the original image may be larger or smaller than that of the object typesetting region, which is not limited in the embodiments of the present disclosure.

Of course, the terminal device may take any one of locally stored images or any one of images sent from other devices as the original image. At this time, the terminal device may identify each of target objects in the original image and a target display position of the target object in the original image through an image identification technology. A target display position of any one of target objects in the original image described in the present disclosure may be represented by a size of the target object and coordinates of any one of pixel points of the object in the original image.

Figure 3:
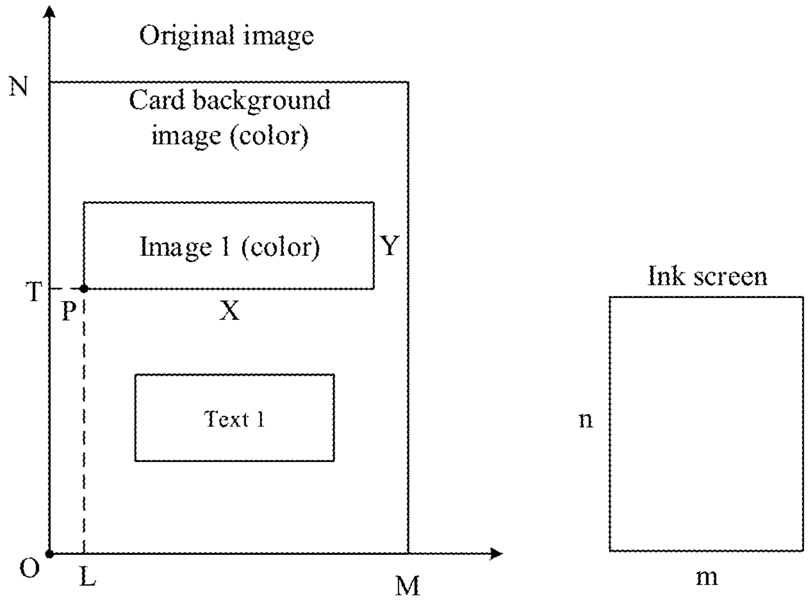
FIG. 3 is a schematic diagram illustrating a size of an original image according to an embodiment of the present disclosure.

Taking the original image shown in FIG. 2 as an example, FIG. 3 is a schematic diagram illustrating a size of the original image. As shown in FIG. 3, a horizontal width of the original image is represented as M pixel points, and a vertical length of the original image is represented as N pixel points, so that a first size of the original image may be denoted as M*N. A plane coordinate system may be established with point O at a lower left corner of the original image being a coordinate origin. Based on the coordinate system, the target display position of each target object in the original image may be represented by coordinate values based on the coordinate system. Assuming that a horizontal width of rectangular image 1 is represented as X pixel points, and a vertical length of the rectangular image 1 is represented as Y pixel points, the terminal device may characterize the target display position of the image 1 in the original image by coordinates of any one of vertexes of the image 1 (for example, point P at a lower left corner) in the coordinate system and values of X and Y, or by coordinates of four vertexes of the image 1 in the coordinate system.

In another embodiment, the terminal device may prerecord the first size of the display region of the ink screen locally, and the first size is used for characterizing the size of the display region. Alternatively, since the position of the terminal device is usually not fixed, the terminal device may be connected with different ink screens at different times. Therefore, the terminal device may establish a network connection with the ink screen, and further request the ink screen through the connection for acquiring the first size of the display region of the ink screen. The first size may be extracted by the terminal device from Extended Display Identification Data (EDID) of the ink screen. Alternatively, the user may learn the first size of the display region of the ink screen in an offline manner, and then manually input the size into the terminal device, so that the terminal device can determine the first size of the display region of the ink screen designated by the user according to the input operation of the user. In an embodiment, the first size of the display region of the ink screen may be equal to or smaller than a screen size of the ink screen, which is not limited in the embodiments of the present disclosure.

At step 104, a monochrome image with the first size is generated according to the original image, where color values of pixel points in the monochrome image include at least one standard color value, and the target object is located at a target display position in the monochrome image.

Based on the target display position of the target object and the first size of the display region of the ink screen determined in the previous embodiment, the terminal device may generate a monochrome image with a size being the first size according to the original image, and the monochrome image may be used for being displayed by the ink screen. The monochrome image includes a target object that has undergone monochrome processing (i.e., a monochrome object described below). The position of each target object in the monochrome image is the target display position of the target object in the original image. In other words, the position of any one of target objects in the original image is the same as its position in the monochrome image.

In the monochrome image described in the present disclosure, the color values of all pixel points include at least one standard color value, where a color value of any one of the pixel points is any one of multiple standard color values. For example, in a case where the monochrome image is a tricolor image composed of black, white and red, three standard color values corresponding to the tricolor image are color values respectively corresponding to the three standard colors: black, white and red, for example, (0, 0, 0), (255, 255, 255) and (255, 0, 0) under an RGB model. Correspondingly, the color value of any one of the pixel points in this image is any one of the three standard color values, that is, the color of any one of the pixel points is black, white or red. Any color value in any one of color models may be used as at least one standard color value corresponding to the monochrome image. For example, the color model may be an RGB model, an RGBa model, a CMYK model, a YUV model, etc. The multiple standard color values may be any color supported by the color models. For example, in addition to black, white and red, the colors may be black and white, red, green and blue, or even multiple different gray values, which is not limited in the embodiments of the present disclosure.

Before the monochrome image is generated, the terminal device may first determine a second size for characterizing a size of the original image, so as to perform image scaling during the generation of the target display position and generate the monochrome image with the size being the first size according to the original image with the size being the second size. Similar to the first size, the second size may be represented by the number of pixel points in different directions. For example, in a case where the second size is M*N, it may be indicated that a horizontal width of the original image is represented as M pixel points, and a vertical length of the original image is represented as N pixel points. Alternatively, the second size may be represented by lengths in different directions. For example, in a case where the second size being 5*10, it may be indicated that a horizontal width of the original image is 5 inches, and a vertical length of the original image is 10 inches, which will not be repeated here.

After the second size is determined, the terminal device may generate the monochrome image in various ways. As an exemplary embodiment, the terminal device may scale the original image first according to a scaling coefficient between the second size and the first size to obtain a first intermediate image with a size being the first size: and further generate the monochrome image with the size being the first size according to the first intermediate image. The scaling process is essentially a process of reducing the number of pixel points. For example, in a case where the first size is m*n and the second size is M*N (M≥m, and N≥n), the scaling coefficient may be M/m. At this time, the terminal device may reduce each rectangular pixel block with a size being M/m*N/n in the original image to one pixel point, and the pixel points obtained after the reduction form the first intermediate image. For the reduction, corresponding color values may be calculated through arithmetic average value, weighted average value or the like. For example, in a case where M/m=N/n=3, the terminal device may calculate a color average value of pixel points in each nine-square grid with a size being 3*3 in the original image, and then take a color average value corresponding to the nine-square grid as a color value of a central pixel point in the nine-square grid, so as to reduce nine pixel points in the nine-square grid to one pixel point. The pixel points obtained after the reduction form the first intermediate image with the size being the first size (i.e., m*n). Of course, in a case where M/m or N/n is not an integer, the terminal device may perform processing by deleting or filling some pixel points or in other ways. It can be understood that, in a case where the total number of color values of all original pixel points in the original image is larger than the total number of standard color values of all pixel points in the monochrome image, the total number of color values of all pixel points in the first intermediate image is usually larger than the total number of standard color values of all pixel points in the monochrome image.

Based on this, the monochrome image with the size being the first size may be further generated according to the first intermediate image. For example, the terminal device may first determine at least one standard color supported by the ink screen (such as black, white and red), and then convert the first intermediate image into a monochrome image that includes the at least one standard color through a monochrome image conversion algorithm for these standard colors. For the monochrome image conversion algorithm and its specific implementation manner, reference may be made to records in the related art, which will not be repeated here. Because the sizes of both the first intermediate image and the generated monochrome image are the first size, during the generation of the monochrome image, only color values of some or all of pixel points in the first intermediate image are changed, without changing the number of pixel points therein.

As another exemplary embodiment, the terminal device may first generate a second intermediate image with a size being the second size according to the original image, and scale the second intermediate image according to a scaling coefficient between the second size and the first size to obtain the monochrome image with the size being the first size. Similar to the previous embodiment, the terminal device may generate the second intermediate image according to the original image through the monochrome image conversion algorithm. It can be understood that, because the sizes of both the original image and the second intermediate image generated according to the original image are the second size, during the generation of the second intermediate image, only color values of some or all of pixel points in the original image are changed, without changing the number of pixel points therein. Through the above method, the terminal device may generate the monochrome image with a size being completely consistent with that of the ink screen (i.e., the first size), thereby helping to ensure the definition of each target object in the monochrome image during the display on the ink screen.

In an embodiment, for target objects included in the original image, the terminal device may first generate monochrome objects respectively corresponding to the target objects according to original color values of the target objects in the original image, where sizes of the generated monochrome objects are respectively matched with the first size. For any one of the target objects, the process of generating a monochrome object corresponding to the target object is a process of determining a standard color value of each pixel point in the corresponding monochrome object according to an original color value of the target object. For any one of pixel points in the monochrome object obtained through the above process, its color value is any one of at least one standard color value corresponding to the monochrome image.

In an embodiment, the terminal device may merge/combine the monochrome objects according to target display positions of the target objects in the original image to obtain the monochrome image with the size being the first size. As shown in FIG. 3, the original image includes three target objects in total: a card background image, an image 1 and a text 1, and the terminal device knows sizes of the three target objects and their target display positions in the original image. Based on this, the terminal device may respectively generate the three target objects into corresponding monochrome objects, that is, respectively obtain the card background image, the image 1, and the text 1 that have undergone monochrome processing. Further, the three target objects after monochrome processing may be merged/combined according to their target display positions in the original image to obtain the monochrome image with the size being the first size, as shown in the "monochrome image" at the bottom of FIG. 2. Obviously, relative positions between the three target objects in the monochrome image obtained through merging/combining are completely the same as that between the three target objects before monochrome processing in the original image. For example, the card background image is located on a lower image layer: the image 1 and the text 1 are located on an upper image layer: and the image 1 is located above the text 1.

It can be understood that the monochrome processing described in this embodiment may include the scaling and the monochrome processing performed through the monochrome image conversion algorithm described in the previous embodiments. Through the above process, not only color values of pixel points corresponding to each target object are converted into corresponding standard color values, but also it can be ensured that a size of each target object is consistent with the first size. That is, the relative position relationship between the target objects after monochrome processing in the monochrome image is completely consistent with that between the target objects before monochrome processing in the original image, which achieves synchronous and equal-proportion scaling of the target objects, and helps to ensure that shapes and relative position relationship of the target objects in the monochrome image obtained through monochrome processing remain unchanged compared with the original image.

In another embodiment, to enable the target objects in the monochrome image to present corresponding display effects, the terminal device may process the target objects through a corresponding monochrome processing style. For example, the terminal device may support multiple monochrome processing styles, such as a color style and/or a line style. The color style is used for indicating at least one standard color value corresponding to the monochrome image. The line style is used for indicating an appearance of a line, where lines are used for composing a monochrome object in the monochrome image. For example, the line style may include at least one of a pen line, a writing brush line, a crayon line, equal thickness lines, or other lines. In addition, the terminal device may provide a user with a monochrome processing style selecting function, so that the user can select a desired monochrome processing style (corresponding to an effect presented in the monochrome image) from alternative monochrome processing styles displayed by the terminal device according to his/her needs, and further the terminal device can perform targeted monochrome processing on the target objects in the original image according to the selected monochrome processing style to obtain the corresponding monochrome image. Of course, in a case where no selecting function is provided or the user makes no selection, the terminal device may process the target objects through a pre-defined default monochrome processing style.

As an exemplary embodiment, the terminal device may determine a unified monochrome processing style for the original image, and process the target objects in the original image according to the unified monochrome processing style to generate the monochrome image. In this method, the target objects in the original image are processed through the same monochrome processing style (i.e., the unified monochrome processing style), so as to ensure that monochrome processing effects on the target objects are same, and further ensure that the target objects in the generated monochrome image have the same monochrome display style, which helps to achieve the unification of image styles and simplifies the monochrome processing performed by the terminal device.

As another exemplary embodiment, the terminal device may determine independent monochrome processing styles respectively corresponding to the target objects in the original image, and respectively process the target objects according to the independent monochrome processing styles respectively corresponding to the target objects to generate the monochrome image. For example, a user may respectively designate corresponding independent monochrome processing styles for target objects, and independent monochrome processing styles for different target objects may be different from each other. For another example, a user may designate a unified monochrome processing style for the original image, and then designate corresponding independent monochrome processing styles for a part of target objects, so that the terminal device may perform monochrome processing on this part of target objects through the corresponding independent monochrome processing styles, and perform monochrome processing on remaining target objects in the original image through the unified monochrome processing style. Through this method, the user may designate different monochrome processing styles for different target objects, so that the terminal device can respectively perform monochrome processing on the target objects according to corresponding monochrome processing styles, which enables different target objects to have different display styles in the monochrome image, presenting more complex and diverse style combinations, and helping to improve the display effect of the monochrome image.

As another exemplary embodiment, to facilitate a user to fully develop his/her creativity, the terminal device may allow the user to designate a monochrome processing style targetedly for a target object in the original image. Taking any one of target objects as an example, the user may perform a style designating operation for any one of the target objects. Correspondingly, in a case where the terminal device detects the style designating operation for any one of the target objects, the any one of the target objects may be processed according to a self-defined monochrome processing style designated by the style designating operation. Of course, in a case where the terminal device does not detect the style designating operation for any one of the target objects, the any one of the target objects may be processed according to a pre-defined default monochrome processing style. The self-defined monochrome processing style may be preset by the user in the terminal device, and the style designating operation may be performed for a target object or simultaneously for multiple target objects, so as to improve the user operation efficiency to the greatest extent.

As can be known from the monochrome processing styles, either one of the unified monochrome processing style and the independent monochrome processing style may include the line style and/or the color style: similarly, either one of the self-defined monochrome processing style and the default monochrome processing style may include the line style and/or the color style, which will not be repeated here.

During the monochrome processing on the original image, the terminal device may first determine at least one standard color value corresponding to a to-be-generated monochrome image. The at least one standard color value corresponding to the to-be-generated monochrome image may be determined in various ways. For example, a color style of the to-be-generated monochrome image (for example, a color style selected by a user) may be first determined, and then at least one standard color value pre-associated with the color style may be determined as at least one standard color value corresponding to the to-be-generated monochrome image. For another example, at least one standard color value designated by a user for the to-be-generated monochrome image may be directly acquired, or a default standard color value may be preset in a system, which will not be repeated here. Further, the terminal device may respectively determine standard color values of pixel points in the monochrome image according to original color values of pixel points in the original image. Taking the monochrome image being a tricolor image corresponding to black, white and red as an example, the terminal device may determine, according to original color values of pixel points in an original image, a color value of any one of pixel points in the monochrome image is a color value corresponding to which one of black, white and red (i.e., which one of the three colors the color of the any one of pixel points in the monochrome image should be).

It can be understood that the process of the terminal device generating the monochrome image is a process of determining the standard color values of the pixel points in the terminal device, while the terminal device itself may not display the monochrome image. The standard color value of each pixel point in the generated monochrome image may be stored by the terminal device in a memory. In an embodiment, after the first size of the ink screen is determined, the terminal device has determined the number of pixel points included in the monochrome image. At this time, the terminal device may allocate corresponding storage space for each pixel point in the monochrome image in the memory to store the standard color value of each pixel point determined in a subsequent process. It can be understood that a size of storage space allocated for the monochrome image in the memory is positively related to the first size of the monochrome image, that is, the larger the first size is, the more pixel points are included in the monochrome image, and accordingly, the more storage space should be allocated for the monochrome image: and vice versa, which will not be repeated here.

At step 106, the monochrome image is sent to the ink screen, so that the monochrome image is displayed by the ink screen in the display region.

After the monochrome image is generated according to the previous embodiment, the terminal device may send the monochrome image to the ink screen for display. As described above, the process of generating the monochrome image is a process of determining the standard color values of the pixel points in the monochrome image. Therefore, sending the monochrome image to the ink screen is essentially sending the standard color values of the pixel points in the monochrome image to the ink screen. For example, in a case where the standard color values are stored in the memory of the terminal device, the terminal device may read the standard color values from the memory and send the standard color values to the ink screen. Of course, the sending may be triggered by a user. For example, in a case of detecting an instruction sent by the user for the monochrome image, the terminal device may start to establish a connection with the ink screen and send the image to the ink screen.

In an embodiment, the terminal device may send the monochrome image to the ink screen through Near Field Communication (NFC) technology. For example, a near field connection between the terminal device and the ink screen may be established based on the NFC technology, so that the monochrome image can be sent to the ink screen based on the near field connection. For a specific process of the near field connection and a specific process of sending the monochrome image based on the near field connection, reference may be made to implementation manners of the NFC technology in the related art, which will not be repeated here. In another embodiment, the connection between the terminal device and the ink screen may be implemented through communication technology such as Bluetooth technology, WiFi or even wired connection, so as to send the monochrome image to the ink screen for display. Of course, any one of the technologies should be implemented with the support of software and hardware resources for the terminal device and the ink screen.

The monochrome image generated according to the previous embodiment is used for being sent to the ink screen for display. To ensure that the display effect of the monochrome image can meet user requirements as far as possible before the monochrome image is sent, the terminal device may further generate and display a monochrome preview image to a user. For example, the terminal device may first determine a third size, which may be used for characterizing a size of an image display region of a second screen different from the ink screen. Next, a monochrome preview image with a size being the third size may be generated according to the original image, and then the monochrome preview image is displayed on the second screen. The specific method for generating the monochrome preview image may be similar to that for generating the monochrome image in the previous embodiment, which will not be repeated here. Similar to the monochrome image, color values of pixel points in the monochrome preview image include at least one standard color value, and target objects are located at target display positions in the monochrome preview image: their difference is that the size of the monochrome preview image is the third size (i.e., the same as that of the image display region of the second screen) instead of the first size. From this, it can be known that display positions of objects in the monochrome preview image are the same as that in the monochrome image, and color values of pixel points in the monochrome preview image are similar to that in the monochrome image. Therefore, the display effect of the monochrome preview image displayed on the second screen is relatively similar to that of the monochrome image displayed on the ink screen, which can facilitate a user to preview the display effect of the monochrome image.

For another example, the terminal device may first determine the third size, then generate the monochrome preview image with the size being the third size according to the monochrome image, and further display the monochrome preview image on the second screen different from the ink screen. At this time, the terminal device may determine a scaling coefficient between the first size and the third size, and then scale the monochrome image with the first size based on the scaling coefficient to obtain the monochrome preview image with the third size.

The second screen and the first screen may be the same screen or different screens. Taking the second screen and the first screen being the same screen as an example, the terminal device may display the monochrome preview image in real time in a preview region next to the object typesetting region of the first screen (in this case, a size of the preview region is the third size), so that a user can view changes in the display effect of the corresponding monochrome image after the object typesetting operation is performed in real time. Based on this, the user can perform more refined and accurate object typesetting operations on target objects, which helps to improve the final display effect of the monochrome image on the ink screen.

As shown in FIG. 2, for the original image with a determined size being the second size, the terminal device may respectively convert the original image into a monochrome image with a size being the first size and a monochrome preview image with a size being the third size through a tricolor image conversion algorithm, then send the monochrome image to the ink screen for display, and provide the monochrome preview image to the second screen for display.

In addition, the monochrome image sent by the terminal device to the ink screen may be used for triggering the ink screen to display the monochrome image in the display region, that is, the ink screen, after receiving the monochrome image, may display the image, thereby improving the display speed of the image and presenting a higher image refresh speed to a user. Alternatively, the ink screen, after receiving the monochrome image sent by the terminal device, may check the size, the standard color value and other parameters of the image, and the ink screen, in a case of determining that its own software and hardware conditions can support the display of the image, may directly display the image or return a confirmation message to the terminal device, and in a case of receiving a display instruction returned by the terminal device, may start to display the monochrome image, so as to ensure the display success rate of the monochrome image.

According to the embodiments of the present disclosure, a target display position of a target object in an original image and a first size of a display region of an ink screen are first determined: then a monochrome image with a size being the first size is generated according to the original image, where color values of all pixel points in the monochrome image include at least one standard color value, and the target object is located at a target display position in the monochrome image: and finally, the monochrome image is sent to the ink screen, so that the monochrome image is displayed by the ink screen in the display region.

Through the embodiments, a monochrome image with a size being the same as that of a display region of an ink screen (i.e. a first size) is directly generated by a terminal device, and a target object is located at a same target display position in the monochrome image as in an original image.

Based on this, a to-be-displayed monochrome image can be displayed directly by the ink screen without being scaled, which avoids details of a target object in the image from being lost, thereby ensuring that the monochrome image displayed by the ink screen has higher definition and avoiding deformation of the target object.

Figure 4:
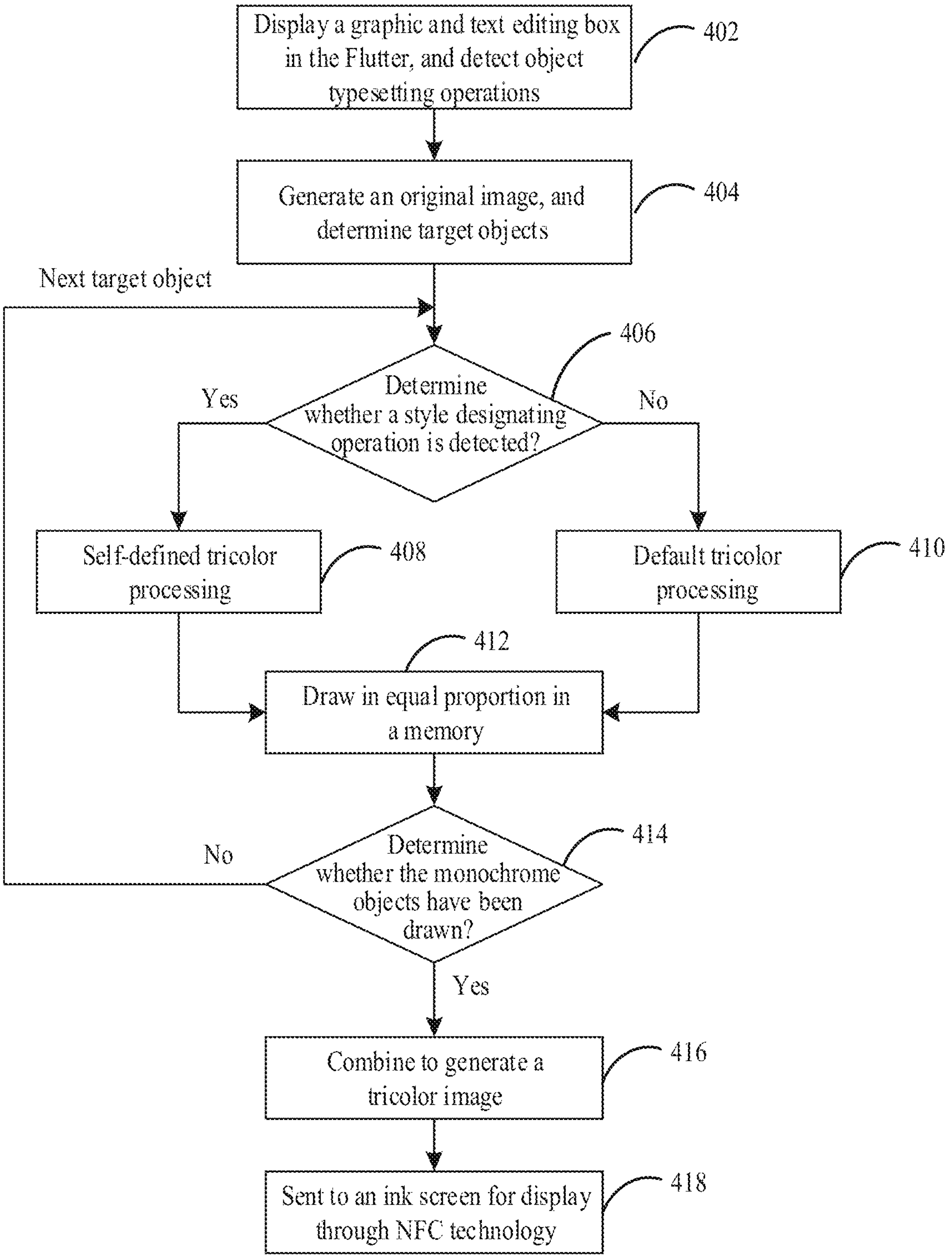
FIG. 4 is a flowchart illustrating another image display method according to an embodiment of the present disclosure.

FIG. 4 is a flowchart illustrating another image display method according to an embodiment of the present disclosure. Taking a process of a user typesetting graphs and texts through a Flutter application running in a mobile phone and generating a tricolor image as an example, the image display method is described. As shown in FIG. 4, the method includes steps 401-418.

At step 402, a graphic and text editing box is displayed in the Flutter application, and object typesetting operations are detected.

The Flutter application may be installed and run in a user mobile phone, and the graphic and text editing box of the application is displayed on a phone screen. The Flutter application may self-adapt to a size of the phone screen, ensuring that the resolution of an original image edited by the user in the graphic and text editing box is matched with that of the phone screen, and presenting a high-quality display effect of the original image, which makes it easy for the user to typeset and edit images, texts and other objects.

In the graphic and text editing box, an editing function and related components provided by the Flutter application may be used to perform object typesetting operations on images, texts and other objects, so as to typeset and edit these objects. For example, a user may import or draw images, paste or write texts, adjust sizes and positions of images or texts through pulling, dragging and other actions, set other parameters of images or texts through a menu bar, etc. For the specific typesetting method, reference may be made to the detailed introduction of the Flutter application in related art, which will not be repeated here.

At step 404, an original image is generated, and target objects in the original image are determined.

After the object typesetting operations are completed, the user may manipulate the mobile phone to generate the original image. For example, the mobile phone may generate an original image based on a displayed picture (including edited images or texts) that has been typeset in the graphic and text editing box through Widget screenshot technology provided by the Flutter application.

Correspondingly, the images, texts or other contents present in the graphic and text editing box may be determined by the mobile phone as target objects in the original image. Moreover, according to the object typesetting operations, a target display position of each target object in the original image may be determined accordingly.

At step 406, it is determined whether a style designating operation is detected.

Afterwards, the mobile phone may start to generate a corresponding tricolor image according to the original image. The user may perform the style designating operation on any one of the target objects in the original image to designate toward the mobile phone which monochrome processing style is used to process the target object, so as to control the style of a monochrome object in the generated tricolor image.

The mobile phone may respectively perform monochrome processing on the target objects in the original image, and the user may perform the style designating operation only on a part of the target objects in the original image. Therefore, the mobile phone may determine whether the user has performed the corresponding style designating operation on the target objects one by one. Taking a current target object (which may be any one of the target objects in the original image) as an example, in a case of detecting that the user has performed the style designating operation on the current target object, the mobile phone may proceed to step 408, and otherwise, proceed to step 410.

In addition, the mobile phone may allow the user to perform the style designating operation on a specific type of target objects. For example, the user may be allowed to perform the style designating operation only on images, but cannot perform the style designating operation on texts. At this time, the mobile phone may respectively determine whether the user has performed the style designating operation on images in the original image. If the user has performed the operation on the current image, tricolor processing is performed on the current image according to a self-defined tricolor processing style designated in the operation: and otherwise, if the user has not performed the operation on the current image, tricolor processing is performed on the current image according to a pre-defined default tricolor processing style. For all texts in the original image, tricolor processing may be performed through the pre-defined default tricolor processing style. Of course, default tricolor processing styles respectively corresponding to images and texts may be same or different, which is not limited in the embodiments of the present disclosure.

At step 408, tricolor processing is performed on a current target object according to a self-defined tricolor processing style.

At step 410, tricolor processing is performed on a current target object according to a default tricolor processing style.

Either one of the self-defined tricolor processing style and the default tricolor processing style may include a line style and a color style. The line style may be used for indicating appearances of lines that compose a monochrome object in a (to-be-drawn) tricolor image. The color style may be used for indicating three standard color values corresponding to the tricolor image, for example, RGB color values respectively corresponding to black, white and red, which will not be elaborated.

It should be noted that the process of performing the tricolor processing on a current target object is a process of determining standard color values of pixel points included in a monochrome object corresponding to the target object. For a color image with rich colors, a monochrome image with only black, white and red may be generated through tricolor processing, and a standard color value of any one of pixel points in the monochrome image is a color value of any one of black, white and red.

At step 412, the current target object is drawn in equal proportion in a memory.

Actually, drawing the current target object in equal proportion in the memory means that standard color values of pixel points in a monochrome object obtained by performing tricolor processing in the step 408 or 410 are fully recorded in the phone memory. The so-called "equal proportion" means that a size ratio of any two of monochrome objects corresponding to standard color values recorded in the memory is completely the same as that of two target objects corresponding to the any two of monochrome objects in the original image. The process of drawing the current target object in equal proportion in the memory will be described below with reference to FIG. 3.

Assuming that the size of the ink screen (i.e., the first size) is m*n (i.e., a horizontal width is represented as m pixel points, and a vertical height is represented as n pixel points), for this, the mobile phone may open up a storage region S with a size being m*n in its memory, that is, the storage region S includes storage space corresponding to m*n pixel points. As shown in FIG. 3, the size of the original image generated in the graphic and text editing box (i.e., the second size) is M*N (i.e., a horizontal width is represented as M pixel points, and a vertical height is represented as N pixel points). At this time, the mobile phone may calculate that scaling coefficients between the second size and the first size are m/M and n/N.

Assuming that the image 1 shown in FIG. 3 is a current target object, it can be known that the size of the image 1 is X*Y (i.e., a horizontal width is represented as X pixel points, and a vertical height is represented as Y pixel points), and coordinates of a positioning point P (at a lower left corner) of the image 1 are P (L, T), that is, a left margin of the point P is represented as L pixel points, and a bottom margin of the point P is represented as T pixel points. Based on this, the mobile phone may calculate that a size (x, y) of an image 1' after tricolor processing corresponding to the image 1 is (X*m/M, Y*n/N). Based on this, the number of pixel points in the image 1' may be determined. In addition, it may be calculated that a position (1, t) of the image 1' in the storage region S is (L*m/M, T*n/N), that is, a left margin of a pixel point P' after tricolor processing is represented as L*m/M pixel points, and a bottom margin of the pixel point P' after tricolor processing is represented as T*n/N pixel points. Based on this, positions of pixel points in the image 1' in the monochrome image may be determined.

Through the above process, the mobile phone may respectively record standard color values of pixel points of a target object after tricolor processing in corresponding storage space in the memory region S, thereby completing the process of drawing the current target object in equal proportion.

At step 414, it is determined whether the target objects in the original image have been drawn.

At this time, the mobile phone may further determine whether all target objects in the original image have been drawn. If all target objects have been drawn, the mobile phone may proceed to step 416, and otherwise, proceed to step 406. Through the process in the steps 406-412, tricolor processing is performed on a next target object, which will not be elaborated.

At step 416, monochrome objects are merged/combined to generate a tricolor image.

Since standard color values of pixel points in any one of the monochrome objects are stored according to positions of the pixel points in the monochrome image, after tricolor processing is respectively performed on the target objects, standard color values of the pixel points in the monochrome image are stored in order of positions in the storage region S. It can be understood that, at this time, the monochrome image obtained after performing tricolor processing on the original image is stored in the storage region S.

At step 418, a monochrome image is sent to an ink screen for display through NFC technology.

At this time, the mobile phone may send the monochrome image to the ink screen in response to user operations or according to preset triggering conditions, for example, send the standard color values of the pixel points stored in the storage region S to the ink screen. Afterwards, the monochrome image may be displayed in the display region of the ink screen according to preset logic.

Figure 5:
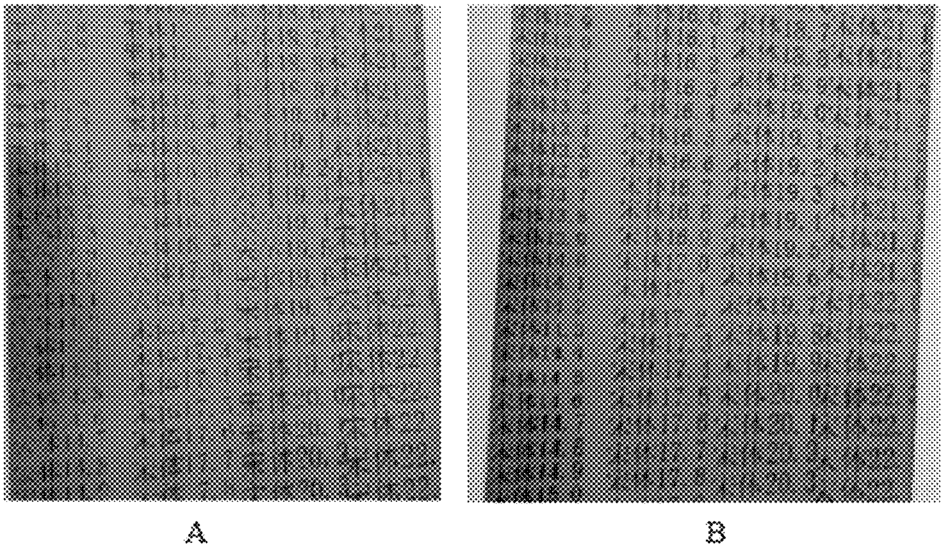
FIG. 5 is a compassion diagram illustrating a display effect of an ink screen according to an embodiment of the present disclosure.

From the above analysis, it can be known that a monochrome image with a size being the same as that of a display region of an ink screen (i.e. a first size) is directly generated by a terminal device, and a target object is located at a same target display position in the monochrome image as in an original image. Based on this, a to-be-displayed monochrome image can be displayed directly by the ink screen without being scaled, which avoids details of a target object in the image from being lost, thereby ensuring that the monochrome image displayed by the ink screen has higher definition and avoiding deformation of the target object. As shown in FIG. 5, FIG. 5A illustrates texts with different word sizes in an image displayed after relevant technology is applied on an ink screen, and FIG. 5B illustrates texts with different word sizes in an image displayed after the image display methods according to the present disclosure are applied on an ink screen. From the comparison between FIG. 5A and FIG. 5B, it can be known that the image display methods according to the present disclosure can indeed improve the definition of target objects in the image displayed on the ink screen to a certain extent.

Corresponding to the image display method embodiments, the present disclosure further provides image display apparatus embodiments.

In an embodiment of the present disclosure, an image display apparatus is provided, including: one or more processors configured to:

determine a target display position of a target object in an original image and a first size of a display region of an ink screen;

generate a monochrome image with the first size according to the original image, where color values of pixel points in the monochrome image include at least one standard color value, and the target object is located at the target display position in the monochrome image;

send the monochrome image to the ink screen, so that the monochrome image is displayed by the ink screen in the display region.

In an embodiment, the processors are further configured to:

display an object typesetting region on a first screen different from the ink screen, and in response to an object typesetting operation detected in the object typesetting region, determine a target object to be typeset;

in response to determining that the object typesetting operation is completed, take a displayed picture corresponding to the object typesetting region as the original image, and take a position of the target object in the object typesetting region as the target display position of the target object in the original image.

In an embodiment, the processors are further configured to:

determine a second size for characterizing a size of the original image;

scale the original image according to a scaling coefficient between the second size and the first size to obtain a first intermediate image with the first size, and generate the monochrome image with the first size according to the first intermediate image;

or, generate a second intermediate image with the second size according to the original image, and scale the second intermediate image according to a scaling coefficient between the second size and the first size to obtain the monochrome image with the first size.

In an embodiment, the processors are further configured to:

generate monochrome objects respectively corresponding to target objects according to original color values of the target objects in the original image, where sizes of the monochrome objects are respectively matched with the first size;

combine the monochrome objects according to target display positions of the target objects in the original image to obtain the monochrome image with the first size.

In an embodiment, the processors are further configured to:

determine a unified monochrome processing style for the original image, and process target objects in the original image according to the unified monochrome processing style to generate the monochrome image; or determine independent monochrome processing styles respectively corresponding to target objects in the original image, and respectively process the target objects according to the independent monochrome processing styles respectively corresponding to the target objects to generate the monochrome image.

In an embodiment, the processors are further configured to:

in response to determining that a style designating operation for any one of target objects is detected, process the any one of target objects according to a self-defined monochrome processing style designated by the style designating operation;

in response to determining that no style designating operation for any one of target objects is detected, process the any one of target objects according to a pre-defined default monochrome processing style.

In an embodiment, either one of the unified monochrome processing style and the independent monochrome processing style, or either one of the self-defined monochrome processing style and the default monochrome processing style includes:

a color style for indicating at least one standard color value corresponding to the monochrome image; and/or, a line style for indicating an appearance of a line, where a monochrome object is composed of lines.

In an embodiment, the processors are further configured to:

determine at least one standard color value corresponding to a monochrome image to be generated;

respectively determine standard color values of pixel points in the monochrome image according to original color values of pixel points in the original image.

In an embodiment, the processors are further configured to:

generate a monochrome preview image according to the original image or the monochrome image, where color values of pixel points in the monochrome preview image include at least one standard color value, and the target object is located at the target display position in the monochrome preview image;

display the monochrome preview image on a second screen different from the ink screen.

In an embodiment, the processors are further configured to:

determine a third size for characterizing a size of an image display region of the second screen;

generate the monochrome preview image with the third size according to the original image or the monochrome image.

In an embodiment, the processors are further configured to:

send the monochrome image to the ink screen through Near Field Communication NFC technology.

In an embodiment of the present disclosure, an electronic device is provided, including: a processor; a memory for storing processor executable instructions, where the processor is configured to implement the image display method according to any one of the embodiments.

In an embodiment of the present disclosure, a non-transient computer readable storage medium on which a computer program is stored is provided, where the program is executed by a processor to perform the steps in the image display method according to any one of the embodiments.

Regarding the apparatus in the above embodiments, the specific manner in which each module performs operations has been described in detail in the embodiments of the relevant method, and will not be elaborated here.

Figure 6:
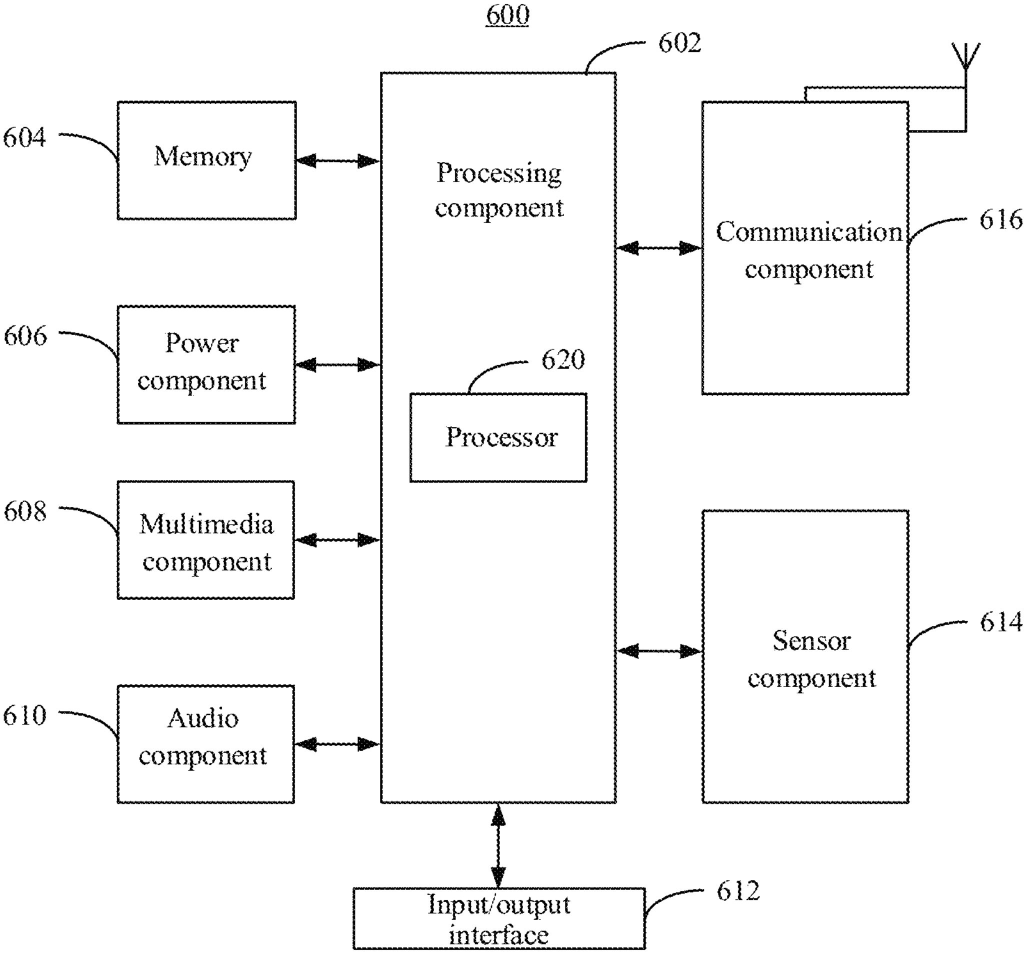
FIG. 6 is a schematic block diagram illustrating an image display apparatus according to an embodiment of the present disclosure.

FIG. 6 is a schematic block diagram illustrating an apparatus 600 for data certificate storage or driving mode determination according to an embodiment of the present disclosure. For example, the apparatus 600 may be a mobile phone, a computer, a digital broadcast terminal, a messaging transceiver device, a game console, a tablet device, medical equipment, fitness equipment, a personal digital assistant, etc.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 usually controls the overall operation of the apparatus 600, such as operations associated with display, telephone calls, data communications, camera operations, and recording operations. The processing component 602 may include one or more processors 620 to execute instructions to perform all or part of the steps in the image display method described above. Moreover, the processing component 602 may include one or more modules to facilitate interaction between the processing component 602 and other components. For example, the processing component 602 may include a multimedia module to facilitate interaction between the multimedia component 608 and the processing component 602.

The memory 604 is configured to store various types of data to support operation at the apparatus 600. Examples of these data include instructions for any application or method operating at the apparatus 600, contact data, phone book data, messages, pictures, videos, and the like. The memory 604 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 606 provides power to various components of the apparatus 600. The power component 606 may include a power management system, one or more power sources, and other components associated with generating, managing, and distributing power for the apparatus 600.

The multimedia component 608 includes a screen that provides an output interface between the apparatus 600 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 608 includes a front camera and/or a rear camera. When the apparatus 600 is in an operation mode, such as a shooting mode or a video mode, the front camera and/or the rear camera may receive external multimedia data. Each of the front and rear cameras may be a fixed optical lens system or have a focal length and an optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, and a voice recognition mode. The received audio signal may be further stored in the memory 604 or transmitted via the communication component 616. In some examples, the audio component 610 also includes a loudspeaker for outputting an audio signal.

The I/O interface 612 provides an interface between the processing component 602 and a peripheral interface module which may be a keyboard, a click wheel, a button, or the like. These buttons may include, but are not limited to a home button, a volume button, a start button, and a lock button.

The sensor component 614 includes one or more sensors for providing a status assessment in various aspects to the apparatus 600. For example, the sensor component 614 may detect an open/closed state of the apparatus 600, and the relative positioning of components, for example, the component is a display and a keypad of the apparatus 600. The sensor component 614 may also detect a change in position of the apparatus 600 or a component of the apparatus 600, the presence or absence of a user in contact with the apparatus 600, the orientation or acceleration/deceleration of the apparatus 600 and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some examples, the sensor component 614 may also include an acceleration sensor, a gyro sensor, a magnetic sensor, a pressure sensor, or a temperature sensor.

The communication component 616 is configured to facilitate wired or wireless communication between the apparatus 600 and other devices. The apparatus 600 may access a wireless network based on a communication standard, such as WiFi, 2G or 3G, 4G LTE, 6G NR or a combination thereof. In an example, the communication component 616 receives broadcast signals or broadcast associated information from an external broadcast management system via a broadcast channel. In an example, the communication component 616 also includes a Near Field Communication (NFC) module to facilitate short range communication. For example, the NFC module may be implemented based on a radio frequency identification (RFID) technology, an infrared data association (IrDA) technology, an ultra-wide band (UWB) technology, a Bluetooth (BT) technology, and other technologies.

In an example, the apparatus 600 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the image display method.

In an example, there is also provided a non-transient computer readable storage medium including instructions, such as a memory 604 including instructions, where the instructions are executable by the processor 620 of the apparatus 600 to perform the image display method. For example, the non-transient computer readable storage medium may be a ROM, a random access memory (RAM), a CD-ROM, a magnetic tape, a floppy disk, and an optical data storage device.

Other embodiments of the present disclosure will be readily apparent to those skilled in the art after considering the specification and practicing the embodiments disclosed herein. The present disclosure is intended to cover any variations, uses, or adaptations of the present disclosure, which follow the general principle of the present disclosure and include common knowledge or conventional technical means in the art that are not disclosed in the present disclosure. The specification and embodiments are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the invention is to be limited only by the appended claims.

It shall be noted that the relational terms such as “first” and “second” used herein are merely intended to distinguish one entity or operation from another entity or operation rather than to require or imply any such actual relation or order existing between these entities or operations. Also, the term “including”, “containing” or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement “including a . . . ” shall not be precluded to include additional same elements present in a process, method, article or device including the elements.

The method and apparatus provided in the embodiments of the present disclosure have been introduced in detail above. Specific examples are used herein to illustrate the principle and implementation manners of the present disclosure. The above description of the embodiments is used only to help understand the method and its core ideas of the present disclosure. At the same time, for those skilled in the art, according to the ideas of the present disclosure, there will be changes in the specific implementation manners and application scope. In conclusion, the contents of the invention should not be construed as limitation to the present disclosure.

The invention claimed is:

1. An image display method, comprising:

determining a target display position of a target object in an original image and a first size of a display region of an ink screen;

generating a monochrome image with the first size according to the original image, wherein color values of pixel points in the monochrome image comprise at least one standard color value, and the target object is located at the target display position in the monochrome image; and sending the monochrome image to the ink screen, so that the monochrome image is displayed by the ink screen in the display region;

wherein generating the monochrome image with the first size according to the original image comprises:

generating monochrome objects respectively corresponding to target objects according to original color values of the target objects in the original image, wherein sizes of the monochrome objects are respectively matched with the first size; and wherein the monochrome objects are obtained by drawing the target objects in an equal proportion; and obtaining the monochrome image with the first size by combining the monochrome objects according to target display positions of the target objects in the original image, wherein relative positions of the monochrome objects in the monochrome image are the same as relative positions of the target objects in the original image;

wherein the target object comprises an image and a text;

wherein generating the monochrome image with the first size according to the original image further comprises:

if the target object is the image, in response to determining that a style designating operation for any one of target objects is detected, processing the any one of target objects according to a self-defined monochrome processing style designated by the style designating operation; and in response to determining that no style designating operation for any one of target objects is detected, processing the any one of target objects according to a pre-defined default monochrome processing style;

if the target object is the text, processing the target object according to the pre-defined default monochrome processing style;

wherein either one of the self-defined monochrome processing style and the default monochrome processing style comprises:

a color style for indicating at least one standard color value corresponding to the monochrome image; and a line style for indicating an appearance of a line, wherein a monochrome object is composed of lines.

2. The method according to claim 1, wherein determining the target display position of the target object in the original image comprises:

displaying an object typesetting region on a first screen different from the ink screen;

in response to an object typesetting operation detected in the object typesetting region, determining a target object to be typeset; and in response to determining that the object typesetting operation is completed, taking a displayed picture corresponding to the object typesetting region as the original image, and taking a position of the target object in the object typesetting region as the target display position of the target object in the original image.

3. The method according to claim 1, wherein generating the monochrome image with the first size according to the original image comprises:

determining a second size for characterizing a size of the original image;

obtaining a first intermediate image with the first size by scaling the original image according to a scaling coefficient between the second size and the first size, and generating the monochrome image with the first size according to the first intermediate image; or, generating a second intermediate image with the second size according to the original image, and obtaining the monochrome image with the first size by scaling the second intermediate image according to a scaling coefficient between the second size and the first size.

4. The method according to claim 1, wherein generating the monochrome image with the first size according to the original image comprises:

determining a unified monochrome processing style for the original image, and generating the monochrome image by processing target objects in the original image according to the unified monochrome processing style; or determining independent monochrome processing styles respectively corresponding to target objects in the original image, and generating the monochrome image by respectively processing the target objects according to the independent monochrome processing styles respectively corresponding to the target objects.

5. The method according to claim 4, wherein either one of the unified monochrome processing style and the independent monochrome processing style comprises at least one of:

a color style for indicating at least one standard color value corresponding to the monochrome image; or, a line style for indicating an appearance of a line, wherein a monochrome object is composed of lines.

6. The method according to claim 1, wherein generating the monochrome image with the first size according to the original image comprises:

determining at least one standard color value corresponding to a monochrome image to be generated; and respectively determining standard color values of pixel points in the monochrome image according to original color values of pixel points in the original image.

7. The method according to claim 1, further comprising:

generating a monochrome preview image according to the original image or the monochrome image, wherein color values of pixel points in the monochrome preview image comprise at least one standard color value, and the target object is located at the target display position in the monochrome preview image; and displaying the monochrome preview image on a second screen different from the ink screen.

8. The method according to claim 7, wherein generating the monochrome preview image according to the original image or the monochrome image comprises:

determining a third size for characterizing a size of an image display region of the second screen; and generating the monochrome preview image with the third size according to the original image or the monochrome image.

9. The method according to claim 1, wherein sending the monochrome image to the ink screen comprises:

sending the monochrome image to the ink screen through a Near Field Communication (NFC) technology.

10. A non-transient computer readable storage medium on which a computer program is stored, wherein the program is executed by a processor to perform the method according to claim 1.

11. An electronic device, comprising:

a processor;

a memory for storing processor executable instructions, wherein the processor is configured to implement operations comprising:

determining a target display position of a target object in an original image and a first size of a display region of an ink screen;

generating a monochrome image with the first size according to the original image, wherein color values of pixel points in the monochrome image comprise at least one standard color value, and the target object is located at the target display position in the monochrome image; and sending the monochrome image to the ink screen, so that the monochrome image is displayed by the ink screen in the display region;

wherein generating the monochrome image with the first size according to the original image comprises:

generating monochrome objects respectively corresponding to target objects according to original color values of the target objects in the original image, wherein sizes of the monochrome objects are respectively matched with the first size; and wherein the monochrome objects are obtained by drawing the target objects in an equal proportion; and obtaining the monochrome image with the first size by combining the monochrome objects according to target display positions of the target objects in the original image, wherein relative positions of the monochrome objects in the monochrome image are the same as relative positions of the target objects in the original image;

wherein the target object comprises an image and a text;

wherein generating the monochrome image with the first size according to the original image further comprises:

if the target object is the image, in response to determining that a style designating operation for any one of target objects is detected, processing the any one of target objects according to a self-defined monochrome processing style designated by the style designating operation; and in response to determining that no style designating operation for any one of target objects is detected, processing the any one of target objects according to a pre-defined default monochrome processing style;

if the target object is the text, processing the target object according to the pre-defined default monochrome processing style;

wherein either one of the self-defined monochrome processing style and the default monochrome processing style comprises:

a color style for indicating at least one standard color value corresponding to the monochrome image; and a line style for indicating an appearance of a line, wherein a monochrome object is composed of lines.

12. The electronic device according to claim 11, wherein determining the target display position of the target object in the original image comprises:

displaying an object typesetting region on a first screen different from the ink screen;

in response to an object typesetting operation detected in the object typesetting region, determining a target object to be typeset; and in response to determining that the object typesetting operation is completed, taking a displayed picture corresponding to the object typesetting region as the original image, and taking a position of the target object in the object typesetting region as the target display position of the target object in the original image.

13. The electronic device according to claim 11, wherein generating the monochrome image with the first size according to the original image comprises:

determining a second size for characterizing a size of the original image;

obtaining a first intermediate image with the first size by scaling the original image according to a scaling coefficient between the second size and the first size, and generating the monochrome image with the first size according to the first intermediate image; or, generating a second intermediate image with the second size according to the original image, and obtaining the monochrome image with the first size by scaling the second intermediate image according to a scaling coefficient between the second size and the first size.

14. The electronic device according to claim 11, wherein generating the monochrome image with the first size according to the original image comprises:

determining a unified monochrome processing style for the original image, and generating the monochrome image by processing target objects in the original image according to the unified monochrome processing style; or determining independent monochrome processing styles respectively corresponding to target objects in the original image, and generating the monochrome image by respectively processing the target objects according to the independent monochrome processing styles respectively corresponding to the target objects.

15. The electronic device according to claim 14, wherein either one of the unified monochrome processing style and the independent monochrome processing style comprises at least one of:

a color style for indicating at least one standard color value corresponding to the monochrome image; or, a line style for indicating an appearance of a line, wherein a monochrome object is composed of lines.

* * * * *